United States Patent
Takae et al.

(10) Patent No.: US 7,099,651 B2
(45) Date of Patent: Aug. 29, 2006

(54) CELLULAR PHONE MANAGING METHOD, MANAGING APPARATUS, RECORD MEDIUM AND CELLULAR PHONE APPARATUS

(75) Inventors: Naohito Takae, Kawasaki (JP); Hiroyuki Tani, Obihiro (JP); Hiroyuki Omiya, Aomori (JP)

(73) Assignee: Fujitsu Limited, Kawasaki (JP)

( * ) Notice: Subject to any disclaimer, the term of this patent is extended or adjusted under 35 U.S.C. 154(b) by 499 days.

(21) Appl. No.: 09/749,420

(22) Filed: Dec. 28, 2000

(65) Prior Publication Data
US 2002/0025799 A1 Feb. 28, 2002

(30) Foreign Application Priority Data
Aug. 31, 2000 (JP) ........................................ 2000-262349

(51) Int. Cl.
*H04M 11/00* (2006.01)

(52) U.S. Cl. .................... 455/406; 455/408; 455/414.1; 455/466

(58) Field of Classification Search ................. 455/406, 455/407, 408, 567, 466
See application file for complete search history.

(56) References Cited

U.S. PATENT DOCUMENTS

| | | | |
|---|---|---|---|
| 5,517,555 A | 5/1996 | Amadon et al. | |
| 5,615,408 A | 3/1997 | Johnson et al. | |
| 5,627,886 A | 5/1997 | Bowman | |
| 5,839,063 A | * 11/1998 | Lee | 455/410 |
| 5,875,236 A | 2/1999 | Jankowitz et al. | |
| 5,898,783 A | 4/1999 | Rohrbach | |
| 5,907,602 A | 5/1999 | Peel et al. | |
| 5,963,625 A | 10/1999 | Kawecki et al. | |
| 6,064,972 A | 5/2000 | Jankowitz et al. | |
| 6,085,179 A | 7/2000 | Halm | |
| 6,131,024 A | * 10/2000 | Boltz | 455/405 |
| 6,208,720 B1 | * 3/2001 | Curtis et al. | 379/114.14 |
| 6,226,364 B1 | * 5/2001 | O'Neil | 379/114.2 |
| 6,301,471 B1 | * 10/2001 | Dahm et al. | 455/405 |
| 6,601,048 B1 | * 7/2003 | Gavan et al. | 706/10 |

FOREIGN PATENT DOCUMENTS

JP 02 092 139 3/1990

OTHER PUBLICATIONS

The Impact of Trading Digital Products on Retail Information Systems by Redmar Luxem; Dept. of Information Systems, Westfälische Wilhelms–Universität Münster (Proceedings of the 33rd Hawaii International Conference on System Sciences –2000).

European Search Report for application No. 01300437.9–2414 PCT dated Nov. 4, 2005 (5 pgs).

* cited by examiner

*Primary Examiner*—Temica M. Beamer
(74) *Attorney, Agent, or Firm*—Stass & Halsey LLP (57) ABSTRACT

A user information generation unit generates user information containing charge arrears statuses from receipt arrears information. A specific user dealing unit extracts specific users from the user information on a delinquent period basis and issues dunning or function restrictions by mail to specific user cellular phones depending on the delinquent period. The specific user dealing unit extracts users which have paid charges as good specific users from the user information and posts cellular phones of the good specific users on the provision of incentives.

16 Claims, 11 Drawing Sheets

USER INFORMATION

DELINQUENT CUSTOMERS

| CUSTOMER NAME | MONTH BEFORE LAST | LAST MONTH | THIS MONTH | |
|---|---|---|---|---|
| CUSTOMER A | PAID | PAID | UNPAID | ----- |
| CUSTOMER B | PAID | UNPAID | UNPAID | ----- |
| CUSTOMER C | UNPAID | UNPAID | UNPAID | ----- |
| CUSTOMER D | UNPAID | UNPAID | PAID IN FULL | ----- |

GOOD CUSTOMERS

| CUSTOMER NAME | MONTH BEFORE LAST | LAST MONTH | THIS MONTH | FEATURES OF CONTENTS USE |
|---|---|---|---|---|
| CUSTOMER E | PAID | PAID | PAID | OFTEN UTILIZES BASEBALL INFORMATION |
| CUSTOMER F | PAID | PAID | PAID | NO FEATURES |

FIG. 3

SPECIFIC USER EXTRACTION INFORMATION 22

22-1

DELINQUENT CUSTOMERS

| CASE | ID CODE | CONTENTS |
|---|---|---|
| 1-MONTH DELINQUENT | 1111 | DUNNING MAIL |
| 2-MONTH DELINQUENT | 2222 | FUNCTION RESTRICTION |
| 3-MONTH DELINQUENT | 3333 | ALARM |
| PAID DURING FUNCTION RESTRICTION | 9999 | FUNCTION RESTRICTION CANCEL |

22-2

GOOD CUSTOMERS

| CASE | ID CODE | CONTENTS |
|---|---|---|
| OFTEN UTILIZES PREVALENT INFORMATION | 4444 | SUPPLY OF BASEBALL WATCHING GUIDE |
| NO FEATURES | 5555 | 1-MONTH FREE FOR CONTENTS USE |

FIG. 4

24 SPECIFIC USER INFORMATION

| CUSTOMER NAME | ID CODE |
|---|---|
| CUSTOMER A | 1111 |
| CUSTOMER B | 2222 |
| CUSTOMER C | 3333 |
| CUSTOMER D | 9999 |
| CUSTOMER E | 4444 |
| CUSTOMER F | 5555 |

FIG. 5

26 MAIL FORMAT

| ID CODE | COMMAND FIELD |
|---|---|
| 1111 | DUNNING COMMAND |
| 2222 | FUNCTION RESTRICTION COMMAND |
| 3333 | ALARM ISSUANCE COMMAND |
| 4444 | BASEBALL WATCHING GUIDE |
| 5555 | CONTENTS 1-MONTH FREE GUIDE |
| 9999 | FUNCTION RESTRICTION CANCEL COMMAND |

20-1 USER INFORMATION

| DELINQUENT CUSTOMERS | | | |
|---|---|---|---|
| CUSTOMER NAME | MONTH BEFORE LAST | LAST MONTH | THIS MONTH | — — — — — — |
| CUSTOMER A | PAID | PAID | UNPAID | — — — — — — |
| CUSTOMER B | PAID | UNPAID | UNPAID | — — — — — — |
| CUSTOMER C | UNPAID | UNPAID | UNPAID | — — — — — — |
| CUSTOMER D | UNPAID | UNPAID | PAID IN FULL | — — — — — — |

FIG. 10

22-1 DELINQUENT USER EXTRACTION INFORMATION

| CASE | ID CODE | CONTENTS |
|---|---|---|
| 1-MONTH DELINQUENT | 1111 | DUNNING MAIL |
| 2-MONTH DELINQUENT | 2222 | FUNCTION RESTRICTION |
| 3-MONTH DELINQUENT | 3333 | ALARM |
| PAID DURING FUNCTION RESTRICTION | 9999 | FUNCTION RESTRICTION CANCEL |

FIG. 11

__24-1__ DELINQUENT USER INFORMATION

| CUSTOMER NAME | ID CODE |
|---|---|
| CUSTOMER A | 1111 |
| CUSTOMER B | 2222 |
| CUSTOMER C | 3333 |
| CUSTOMER D | 9999 |

FIG. 12

_26-1_ MAIL FORMAT

| ID CODE | COMMAND FIELD |
|---|---|
| 1111 | DUNNING COMMAND |
| 2222 | FUNCTION RESTRICTION COMMAND |
| 3333 | ALARM ISSUANCE COMMAND |
| 9999 | FUNCTION RESTRICTION CANCEL COMMAND |

FIG. 13

CELLULAR PHONE MANAGING METHOD, MANAGING APPARATUS, RECORD MEDIUM AND CELLULAR PHONE APPARATUS

BACKGROUND OF THE INVENTION

1. Field of the Invention

The present invention relates generally to a cellular phone managing method, a cellular phone managing apparatus, a record medium and a cellular phone apparatus, in which information and control required for the management of the cellular phone are provided by a server of a connection business enterprise, and more particularly to a cellular phone managing method, a cellular phone managing apparatus, a record medium and a cellular phone apparatus stored record medium, in which users conforming to specific conditions are extracted from cellular phone use information so that dealings necessary for the management are presented by mail to the cellular phones of the extracted users.

2. Description of the Related Arts

At present, any cellular phone users can use the same functions as long as the form of contract with the connection business enterprises and the type of the cellular phones are the same. For the charge delinquent users, a dunning letter designating the payment limit is created and sent by postal mail to the users for urging the payment of the arrears.

However, the following problems are posed on such conventional cellular phone management by the connection business enterprises. First, if the cellular phone type conforms to the contents of the contract, the available functions will be the same in spite of the charge delinquency, and hence some users may often not pay the charges till the halt of communication. Second, the dunning letters need to be created and sent to the charge delinquent users, which takes a lot of time and labor with increased costs for print and sending. Third, good users often utilizing the communications and contents but free from charge delinquency can merely accept the same dealings as the charge delinquents and cannot enjoy sufficient services.

SUMMARY OF THE INVENTION

The present invention provides a cellular phone managing method, a cellular phone managing apparatus, a managing program stored record medium and a cellular phone apparatus, enabling connection business enterprises to make appropriate dealing and management depending on the charge payment and use status.

According to a first aspect of the present invention there is provided a cellular phone managing method comprising a user information generation step for generating and accumulating cellular phone user information; and a specific user dealing step for extracting a specific user conforming to predetermined conditions from the user information and for dealing with a cellular phone of the extracted specific user in accordance with the extraction conditions. As measures against the charge delinquent users, the user information generation step may include generating user information containing charge arrears status from cellular phone receipt arrears information; and the specific user dealing step may include extracting a specific user from the user information on a delinquent period basis and issuing dunning and/or function restriction to a cellular phone of the specific user depending on the delinquent period. The specific user dealing step may include sending a dunning mail to a cellular phone of the specific user in case of a short delinquent period, imposing a restriction on functions of the cellular phone of the specific user in addition to the dunning mail in case of a longer delinquent period, and causing the cellular phone of the specific user to generate an alarm in case of an even longer delinquent period. For example, the specific user dealing step may include sending a dunning mail to a cellular phone of the specific user in case of one-month delinquent, imposing a restriction on functions of the cellular phone of the specific user in addition to the dunning mail in case of two-month delinquent, and causing the cellular phone of the specific user to generate an alarm in case of three-month delinquent. The specific user dealing step may include imposing a restriction on download of a specific content as the cellular phone function restriction. The specific user dealing step may include causing the cellular phone to generate a sound known as a dunning alarm to everyone. The specific user dealing step may include canceling the function restriction when payment of arrears is recognized during the cellular phone function restriction. By extracting such charge delinquents as the specific users to make dunning, function restriction and alarm generation on their cellular phones, the charge delinquent users are subjected to any function restriction such as incapability of contents downloads which were available so far, in spite of the possible communication, with the result that the delinquent users may positively pay the arrears for the purpose of utilizing the contents. By causing the yet delinquent user' cellular phone to generate an delinquent alarm widely known to everyone by mass media, the surrounding persons can know that the cellular phone user is a charge delinquent, and hence to avoid this, the user may positively pay the arrears. Furthermore, the dunning for the arrears is sent in the form of a mail to the user's cellular phone so that the time and costs taken for dunning are reduced to a large extent. On the contrary, as dealings for the good customers, the specific user dealing step may includes extracting a user who has not failed to pay charge over a certain period of time as a good specific user from the user information and posting the cellular phone of the good specific user on the provision of an incentive. The incentive may include providing any one selected from the group consisting of contents intended for good users, contents use free of charge service with time limit, a discount service with time limit, and points. The user information generation step may include generating user information containing a contents use feature of a user from contents use information of the cellular phone, and the specific user dealing step may include providing contents intended for good users corresponding to the contents use feature to the cellular phone of the specific user. By providing various benefits to good users in this manner, it is possible to differentiate the good users from the charge delinquent users so that a further promotion of use and an incentive to new subscribers are expected.

According to a second aspect of the present invention, there is provided a cellular phone managing apparatus comprising a user information generation unit 12 for generating and accumulating cellular phone user information; and a specific user dealing unit 14 for extracting a specific user conforming to predetermined conditions from the user information and for dealing with a cellular phone of the extracted specific user in accordance with the extraction conditions. The details of the cellular phone managing apparatus become substantially the same as the case of the method described hereinabove.

According to a third aspect of the present invention there is provided a cellular phone apparatus comprising a judging unit for judging whether an electronic mail received designates a restriction on a certain function of the cellular phone; and a restricting unit which, when the judging unit judges that the electronic mail designates a restriction of the certain function of the cellular phone, imposes a restriction on the designated certain function of the cellular phone.

According to a fourth aspect of the present invention there is provided a computer readable record medium having therein stored a program for managing the cellular phone, the record medium storing the program comprising a user information generation step for generating and accumulating cellular phone user information; and a specific user dealing step for extracting a specific user conforming to predetermined conditions from the user information and for dealing with a cellular phone of the extracted specific user in accordance with the extraction conditions. The details of the record medium are also substantially the same as the above apparatus configuration.

The above and other objects, aspects, features and advantages of the present invention will become more apparent from the following detailed description when read in conjunction with the accompanying drawings.

DESCRIPTION OF THE PREFERRED EMBODIMENTS

Figure 1:
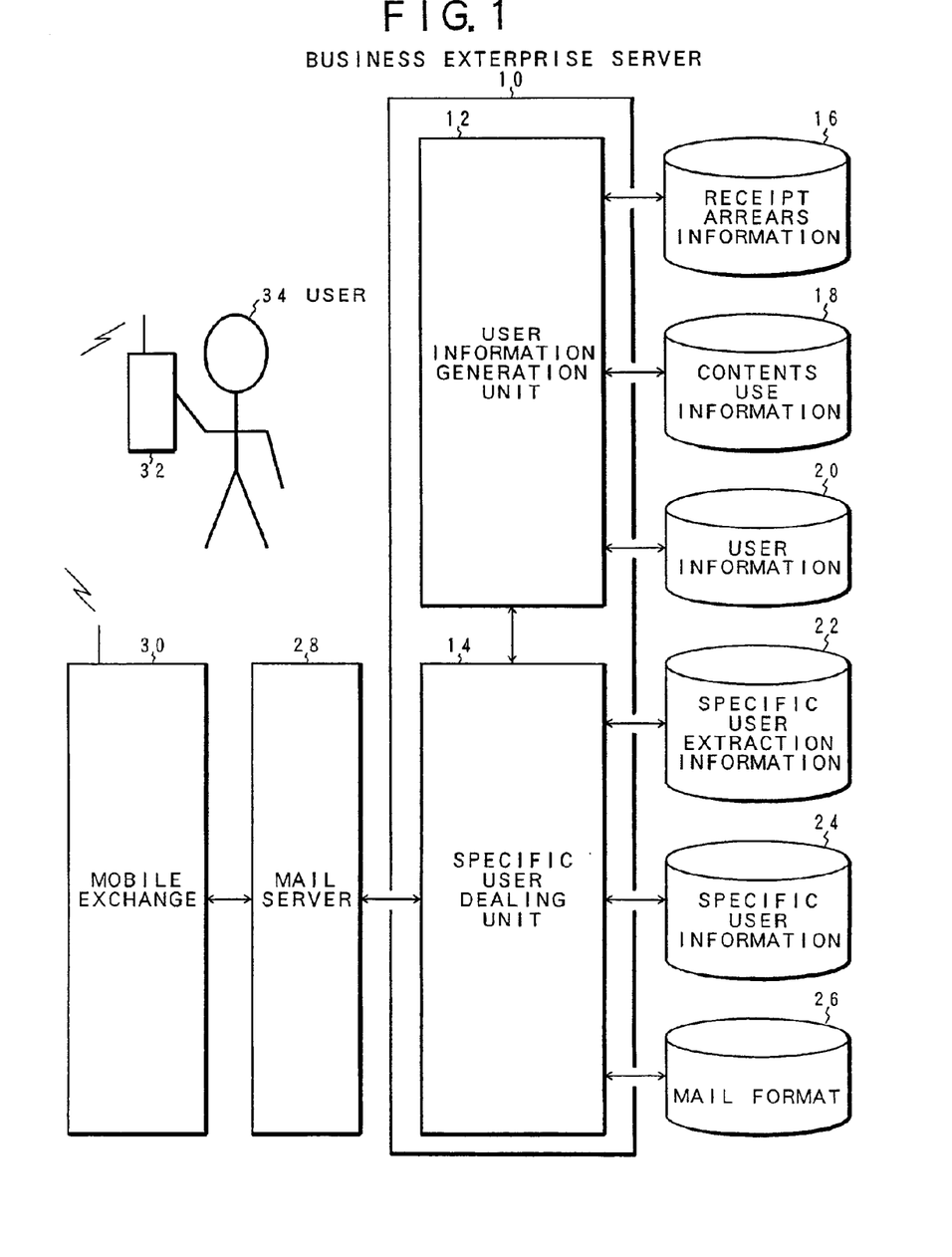
FIG. 1 is a block diagram of a mobile communication system equipped with a cellular phone managing apparatus in accordance with the present invention.

FIG. 1 is a block diagram of a mobile communication system employing a cellular phone managing apparatus in accordance with the present invention. The cellular phone managing apparatus of the present invention is implemented in the form of a business enterprise server 10 which is provided by a connection business enterprise in the mobile communication system and which is provided with a user information generation unit 12 and a specific user dealing unit 14. Associated with the business enterprise server 10 is a data file or a data table for performing control processing of the cellular phone management of the present invention, the data file including receipt arrears information 16, contents use information 18, user information 20, specific user extraction information 22, specific user information 24 and a mail format 26. The business enterprise server 10 is connected via a mail server 28 to a mobile exchange 30 so that a mail created by the business enterprise server 10 can be sent to a cellular phone 32 of a user 34 for the provision of a mail service. The user information generation unit 12 provided in the business enterprise server 10 generates and accumulates cellular phone user information 20 every month. For example, the user information generation unit 12 makes a monthly check of the charge payment status of the users through the reference to the receipt arrears information 16 and generates user information 20 required for specifying the delinquent users. At the same time, in order to specify good users for the provision of incentives, the user information generation unit 12 makes a monthly reference to the cellular phone contents use information 18 to generate and accumulate user information 20 containing the good users and their features of contents use.

Figure 2:
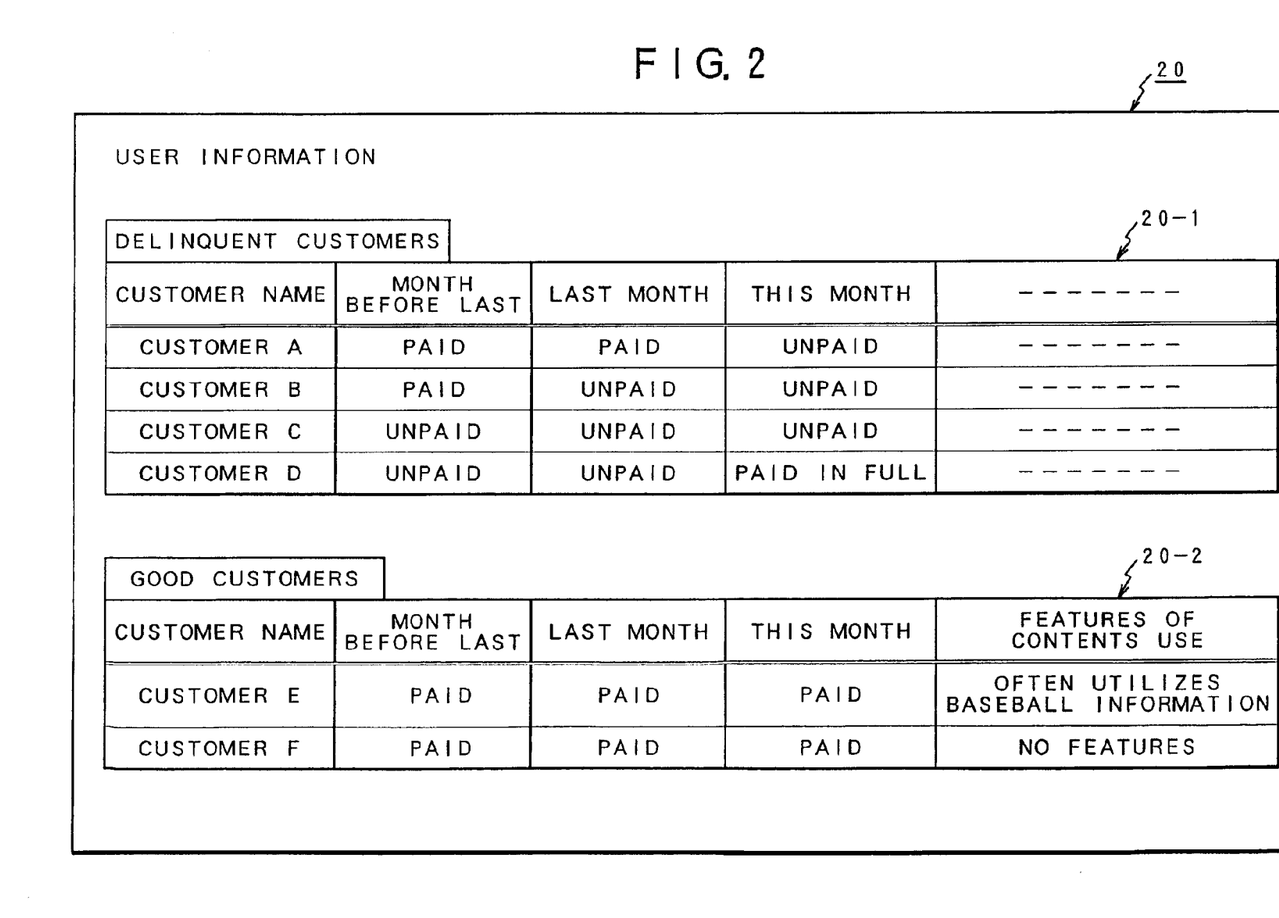
FIG. 2 is an explanatory diagram of a user information of FIG. 1.

FIG. 2 is an explanatory diagram of the user information 20 generated by the user information generation unit 12 of FIG. 1. Through the reference to the receipt arrears information 16, this user information 20 includes separately accumulated user information 20-1 on the arrears customers who have failed to pay the charges and user information 20-2 on the good customers who have not failed to pay the charges. The user information 20-1 on the arrears customers contains customer name, and month before last, last month and this month indicative of the arrears month, the user information 20-1 storing therein the payment status on three customers A, B and C for example. The customer A has not yet paid the charge this month, the customer B has not yet paid the charges this month and the last month, and the customer C has not yet paid the charges this month, the last month and month before last. Furthermore, record is made of the customer D that he/she has failed to pay the charges this month, last month and month before last and that he/she has paid all the amount of the arrears after the restriction on functions of the cellular phone which will be made clear in the later description. On the other hand, the user information 20-2 on the good customers newly contains the item of "features of contents use", in addition to the items of the customer name, month before last, last month and this month. For the item of "features of contents use", the contents use information 18 of FIG. 1 is referred to extract the features of the contents use of the good customers having no arrears from the hysteresis of the contents download by the cellular phone, for the storage therein. In this case, the customer E has an extraction of the features of the contents use that "often utilizes baseball information" through the reference to the contents use information 18. The customer F bears "no features" since there are no specific contents use features. Referring again to FIG. 1, the specific user dealing unit 14 extracts specific users meeting predetermined conditions from the user information 20 having the contents of FIG. 3 for example generated by the user information generation unit 12, to deal with the cellular phones of the thus extracted specific users in conformity with the extraction conditions. The specific user extraction information 22 defines the conditions for the extraction of the specific users and the contents of dealing by this specific user dealing unit 14.

Figure 3:
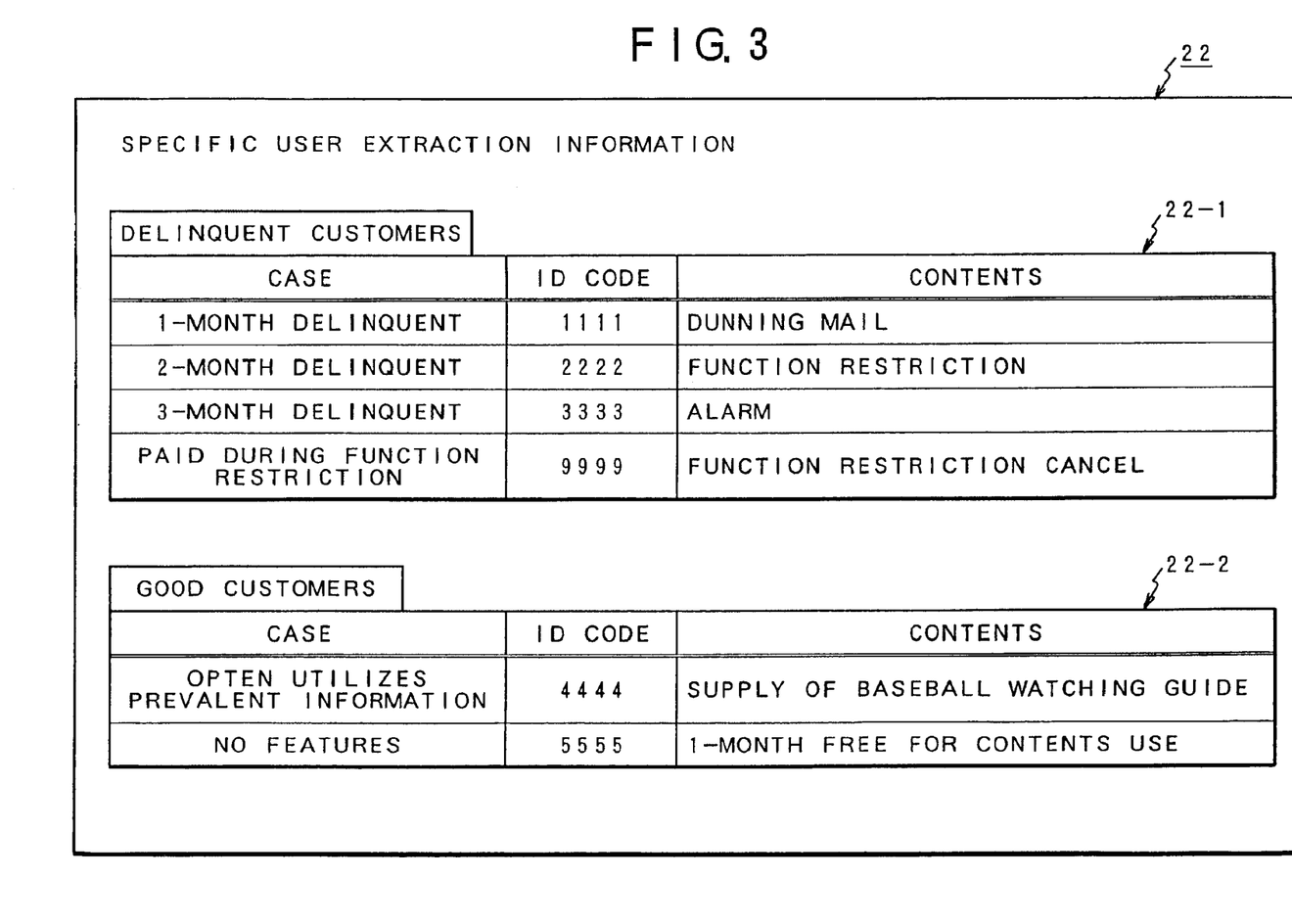
FIG. 3 is an explanatory diagram of a specific user extraction information of FIG. 1.

FIG. 3 is an explanatory diagram of the specific user extraction information 22 of FIG. 1. In this embodiment, the specific user extraction information 22 includes separately provided delinquent user extraction information 22-1 on the delinquent customers and good user extraction information 22-2 on the good customers. First, the delinquent user extraction information 22-1 on the delinquent customers is ranked into three delinquent customer cases, i.e., 1-month delinquent, 2-month delinquent and 3-month delinquent, with identification codes 1111, 2222 and 3333 being allocated to the respective cases for rank identifications. Contents of dealing made on the users depending on the delinquent terms include a dunning mail for 1-month delinquent, a function restriction for 2-month delinquent, and an alarm for 3-month delinquent. The 1-month delinquent dunning mail is sent to the cellular phone of a specific user extracted as a delinquent user, for urging the payment of the charge. In case of 2-month delinquent function restriction, a dunning mail is sent to the cellular phone of the user specified as a delinquent customer, with a function restriction command is added to the dunning mail so that upon a receipt of the mail by the user cellular phone the contents download for example is prohibited. For the 3-month delinquent alarm, an alarm generation command is added to the dunning mail in order to cause the cellular phone of the 3-month delinquent user to generate a dunning alarm. Used as this dunning alarm is a message or a melody every one knows that it indicates the arrears of cellular phone charges, which is widely known through advertisement by mass media such as televisions or radios provided by the cellular phone connection business enterprise. The delinquent user extraction information on the delinquent customers contains the case "paid during function restriction" to which allocated an identification code 9999. If this condition is extracted, then "function restriction cancel" is performed as the functions for the user cellular phones. In the event of two or more month delinquency, a function restriction is applied to the user cellular phone such that upon the payment of the charge by the user in this state, function restriction cancel of the user cellular phone utilizing the identification code 9999 is performed when the completion of payment during the function restriction is recognized as the case of the specific user. On the other hand, the good customer extraction information 22-2 on the good customers includes two cases "often utilizes prevalent information" and "no features" as the specific user extraction conditions, with identification codes 4444 and 5555, respectively added thereto. In the event that, for the case "often utilizes prevalent information", the contents use feature "often utilizes baseball information" is extracted as the user information as in the customer E of the user information 20-2 on the good customers of FIG. 3, the contents of incentives for the good customers corresponding to the respective cases include e.g., information service "supply of baseball watching guide" corresponding to the features of the contents use. The contents of incentives for the case "no features" may include e.g., "1-month free for contents use". Naturally, for the classification of the good customers and the setting of the contents of incentives, the provision of appropriate incentives may be determined depending on the ranks of the good customers, such as addition of points in case of adoption of the point system and the discount of the use charges for limited period. The specific user dealing unit 14 of FIG. 1 refers to the user information 20 using the specific user extraction information 22 of FIG. 3 as the extraction conditions (filters), to thereby extract the customer name meeting the extraction conditions of the specific user extraction information and generate specific user information 24 having identification codes added thereto corresponding to the extraction conditions.

Figure 4:
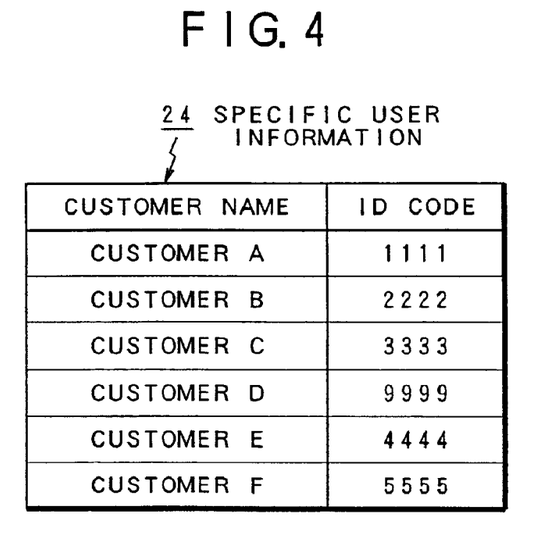
FIG. 4 is an explanatory diagram of a specific user information of FIG. 1.

FIG. 4 shows the contents of the specific user information 24 generated from the user information 20 of FIG. 3 by using the specific user extraction information 22 of FIG. 3. If for example the user information 20 of FIG. 3 is referred to by the case "1-month delinquent" which is the extraction condition of the delinquent user extraction information 22-1 on the delinquent customers in the specific user extraction information 22 of FIG. 3, then the customer A who has not yet paid the charge of this month meets the extraction condition and is extracted as a 1-month delinquent specific user, with the identification code 1111 being given to the customer A, which are both entered as the customer name and identification pair into the specific user information 24 of FIG. 4. In the same manner, the customers B, C, D and F are extracted from the user information 20 of FIG. 3 by the specific user extraction information of FIG. 4 and are given the corresponding identification codes to generate the specific user information. After the generation of the specific user information 24 comprised of the customer name and identification code pair of FIG. 4 by the specific user dealing unit 14 of FIG. 1 in this manner, the mail format 26 is referred to by the identification code of the specific user information 24 to generate a corresponding mail and send the mail to the cellular phone 32 of the specific user together with the identification code.

Figure 5:
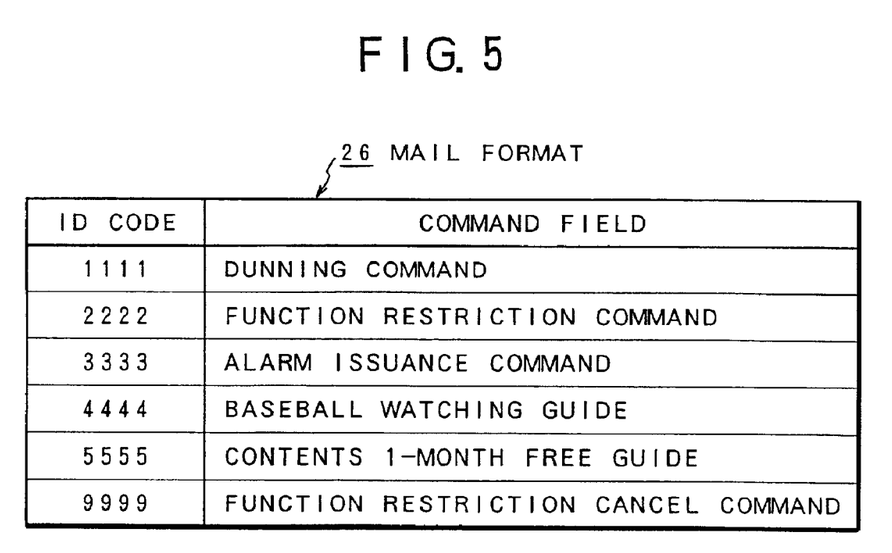
FIG. 5 is an explanatory diagram of a mail format of FIG. 1.

FIG. 5 shows the contents of the mail format 26 of FIG. 1 in which a mail format having a command field is in advance prepared correspondingly to the identification code using the specific user extraction information 22 of FIG. 3. In this case, the identification code 1111 indicates the 1-month delinquent specific user, so that the command field has a mail format of "dunning command" The identification code 2222 indicates the 2-month delinquent specific user, so that the command field has a mail format of "function restriction command". The identification code 3333 indicates the 3-month delinquent specific user, so that the command field has a mail format of "alarm issuance command". On the other hand, the identification code 4444 indicates the good customers often utilizing the prevalent information, so that the command field has a mail format of "baseball watching guide" corresponding to the features of the contents use. The identification code 5555 indicates the good customers having "no features" of the contents use, so that the command field has a mail format of "contents 1-month free guide" as the incentives for the good customers. The identification code 9999 indicates that all the arrears have been paid during the function restriction period of the cellular phone as a result of two or more month delinquency, so that the command field has a mail format of "function restriction cancel". By referring to such a mail format 26 of FIG. 5 by use of the identification codes of the specific user information 24 generated as shown in FIG. 4, a mail is created through the read of the mail format, the mail having the contents of measures against the delinquent customers and the contents of incentives for the good customers defined by the specific user extraction conditions, of the customers extracted as the specific users. The thus created mail is sent from the mail server 28 via the mobile exchange 30 to the cellular phone 32 of the user 34 extracted as the specific user.

Figure 6:
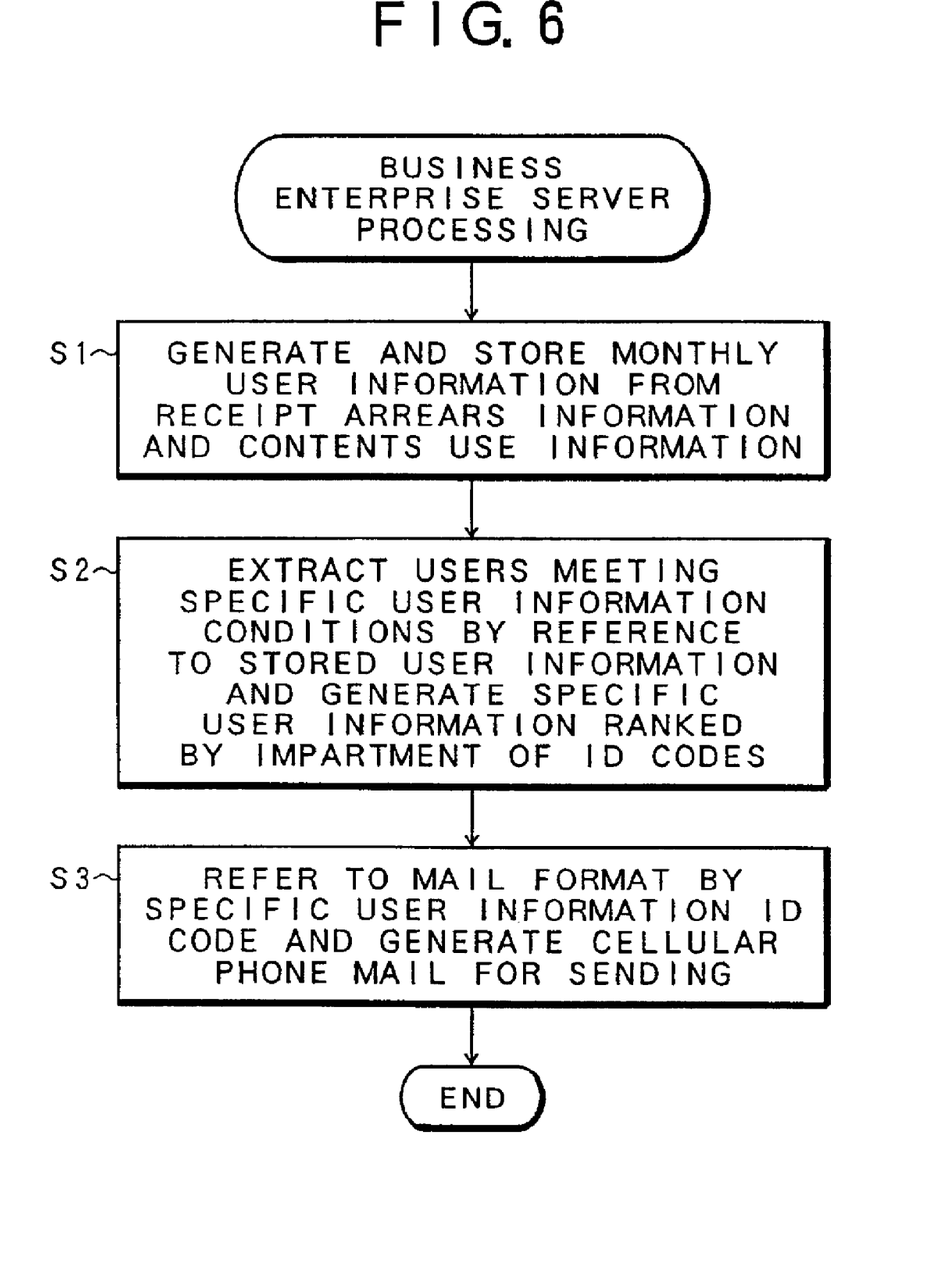
FIG. 6 is a flowchart of business enterprise server processing of FIG. 1.

FIG. 6 is a flowchart of the processing operations of the business enterprise server 10 functioning as the cellular phone managing apparatus in accordance with the present invention of FIG. 1. In step S1, from the receipt arrears information 16 and from the contents use information 18, the business enterprise server 10 monthly generates the user information 20 for accumulation by the user information generation unit 12, the user information 20 containing the use charge payment status and contents use features of the good customers having no arrears as shown in the user information of FIG. 2. Then in step S2, by referring to the thus accumulated user information 20, a user is extracted who conforms to the conditions of the specific user extraction information prepared in advance as in FIG. 3, identification codes corresponding to the extraction conditions being added to the customer names for ranking to thereby create the specific user information 24 as in FIG. 5. After the generation of the specific user information 24 in this manner, the mail format 26 having the contents of FIG. 6 is referred to in step S3 by use of the identification codes stored correspondingly to the customer names of the specific user information 24 so that a mail is created and sent to the cellular phone on the basis of the mail format corresponding to the identification codes. In this processing of the business enterprise server 10, the generation of the user information in step S1 is a processing in which the user information is generated and accumulated of the last month once a month, e.g., on the first day of the next month, and depending on the monthly generation of the user information there are basically carried out the generation of the specific user information in step S2 and the mail creation and sending to the cellular phone in step S3 based on the specific user information. As opposed to this, in case of the function restriction on the cellular phone, the charge payment is checked in real time so that if the charge payment is recognized, the user who has made the charge payment is extracted as the specific user and that the identification code 9999 is set in the specific user information, with a function restriction cancel mail is sent to the terminal of the user who has made the charge payment to thereby cancel the function restriction. Furthermore, the sending of a mail to the cellular phone of the specific user in step S3 is not limited to the monthly, but the sending of the dunning mail depending on the delinquent period may iteratively made weekly for example.

Figure 7:
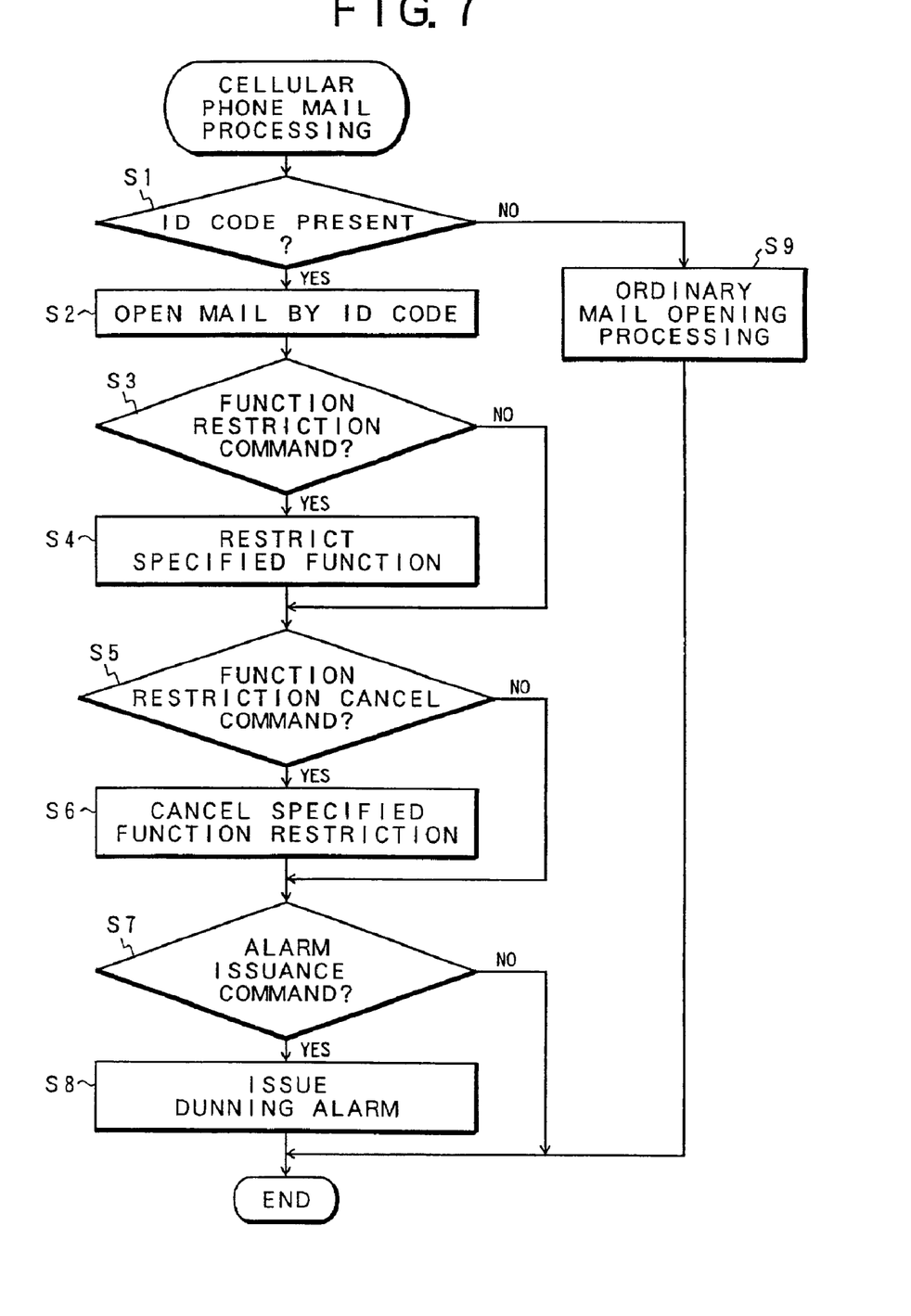
FIG. 7 is a flowchart of cellular phone mail processing of FIG. 1.

FIG. 7 is a flowchart of the cellular phone mail processing of the user cellular phone for the mail sending to a specific user by the business enterprise server 10 of FIG. 1. This cellular phone mail processing is started upon the receipt of a mail so that a check is made in step S1 to see if the received mail is provided with an identification code or not. If affirmative, then the mail is judged to be one from the business enterprise server 10 of the connection business enterprise, allowing the procedure to go to step S2 for opening the mail on the basis of the identification code received. Then, carried out are interpretation of the command contained in the opened mail and the processing based on the interpreted command. It is first checked in step S3 whether it is a function restriction command or not, and if affirmative, then in step S4 a function restriction is made such as prohibition of the designated function, e.g., the contents download. After the execution of this function restriction, the function restriction cancel command is judged in step S5, then the designated function restriction is cancelled in step S6. If the alarm issuance command is judged in step S7, a dunning alarm is issued in step S8. On the contrary, if the received mail is provided with no identification code in step S1, the procedure goes to step S9 for performing the ordinary mail opening processing. In order to implement such a processing, the cellular phone 32 comprises a judgment unit for judging whether the received electronic mail designates the restriction of a certain function of the cellular phone; and a restriction unit which, when it is judged by the judgment unit that the electronic mail designates the restriction of a certain function of the cellular phone, restricts the certain function designated of the cellular phone.

Figure 8:
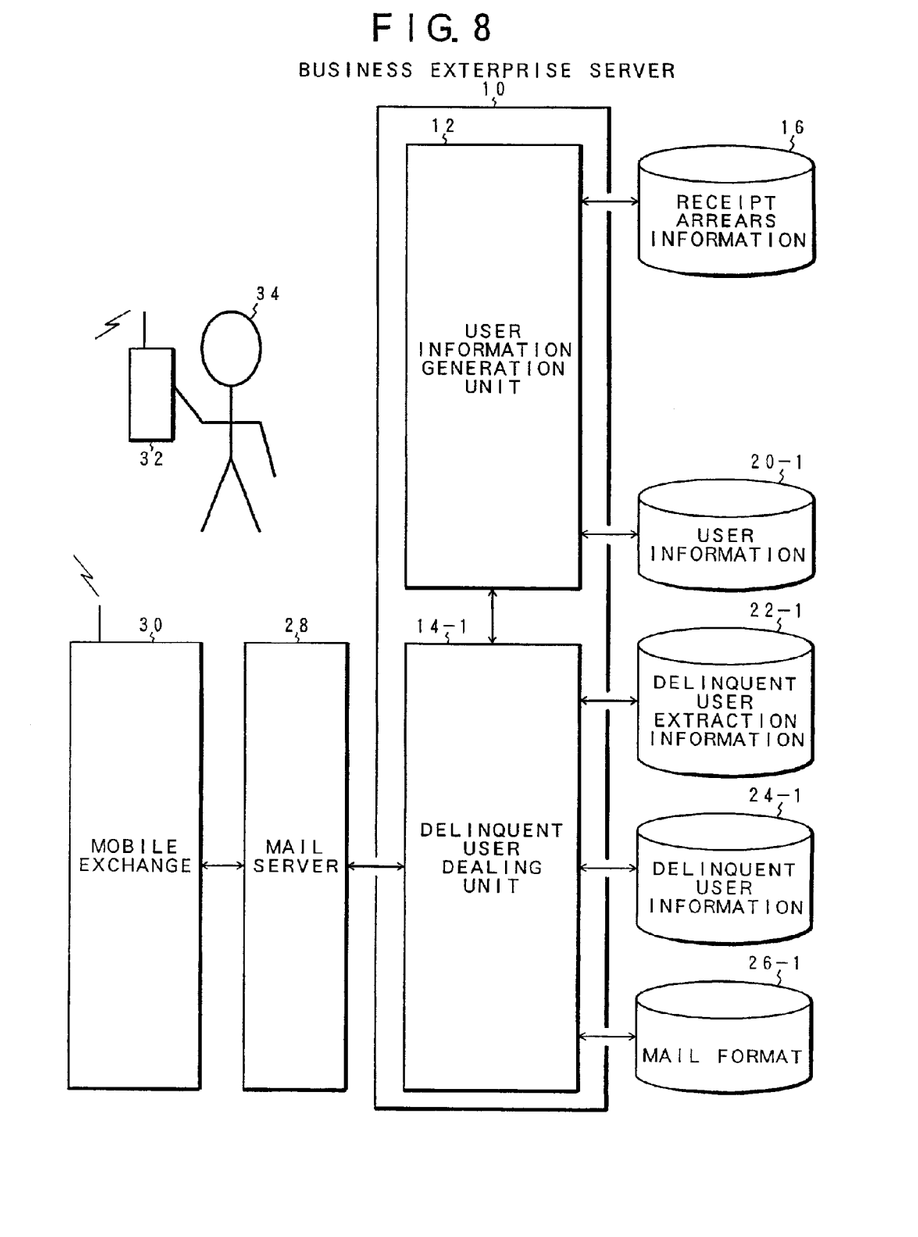
FIG. 8 is a block diagram of a mobile communication system equipped with a cellular phone managing apparatus in accordance with the present invention directed to a delinquent user.
Figure 9:
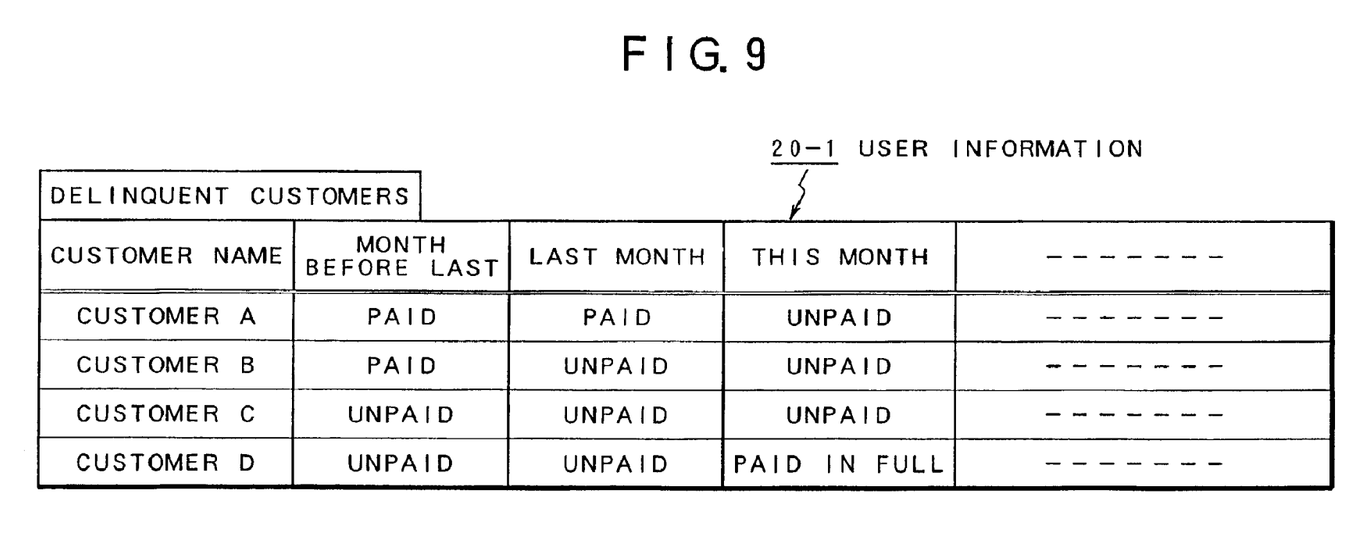
FIG. 9 is an explanatory diagram of user information of FIG. 6.
Figure 10:
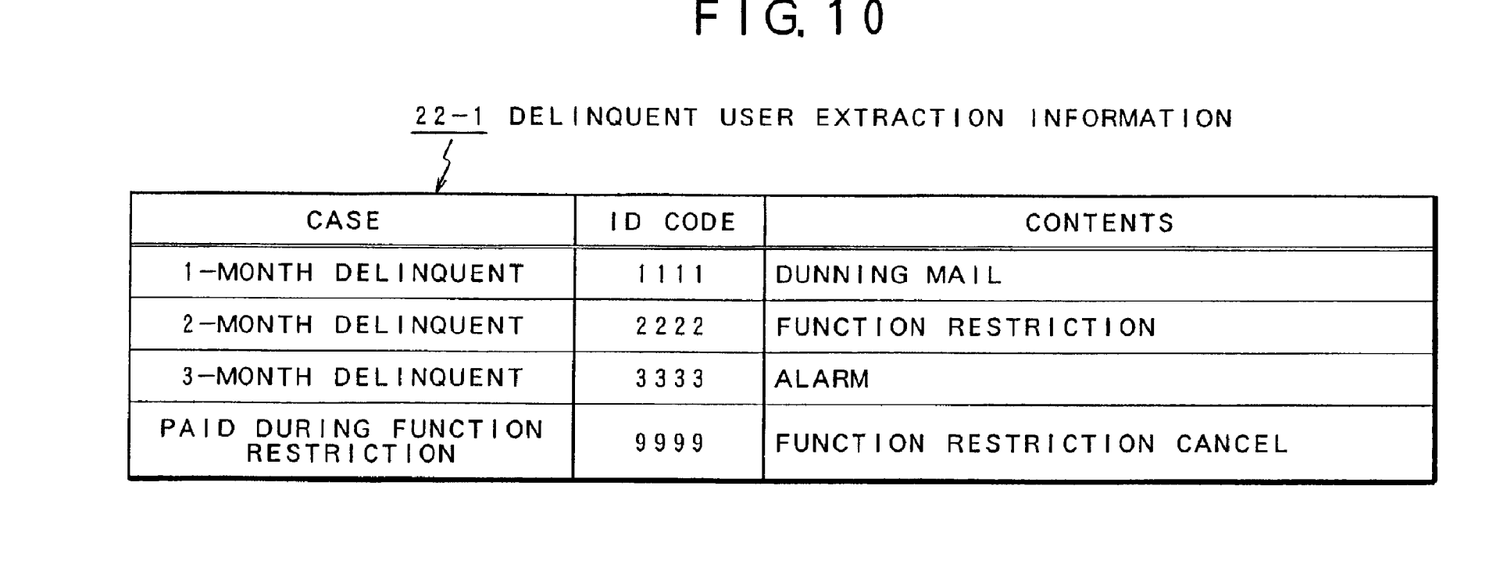
FIG. 10 is an explanatory diagram of delinquent user extraction information of FIG. 8.
Figure 11:
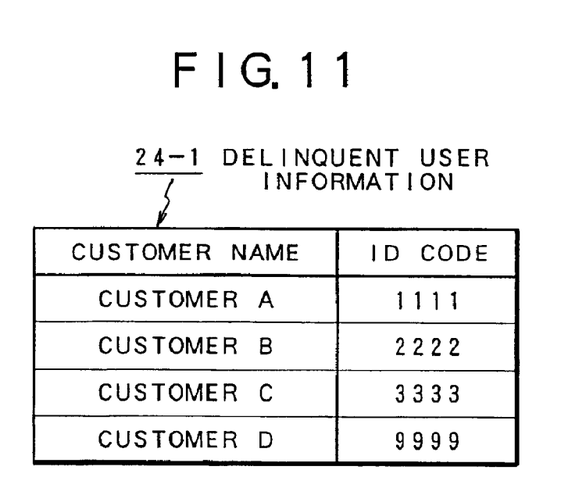
FIG. 11 is an explanatory diagram of delinquent user information of FIG. 8.
Figure 12:
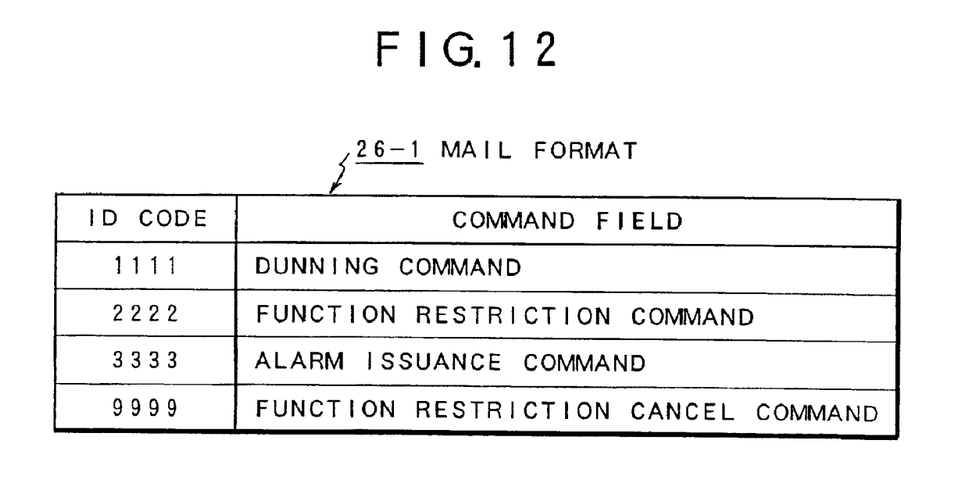
FIG. 12 is an explanatory diagram of a mail format of FIG. 8.

FIG. 8 shows another embodiment of the mobile communication system equipped with the cellular phone managing apparatus of the present invention. This embodiment is characterized in that the business enterprise server 10 functioning as the cellular phone managing apparatus performs a processing directed to only the delinquent user as the specific user. The user information generation unit 12 of the business enterprise server 10 refers to receipt arrears information 16 to monthly generate and accumulate the user information 20-1 on the delinquent customers as in FIG. 9. On the other hand, a delinquent user dealing unit 14-1 extracts delinquent users from the user information 20-1 by use of the conditions of delinquent user extraction information 22-1. As shown in FIG. 10, the delinquent user extraction information 22-1 is classified into four cases, i.e., 1-month delinquent, 2-month delinquent, 3-month delinquent and paid during function restriction, with defined correspondingly thereto identification codes and the contents of measures against the delinquent user cellular phones. For this reason, the delinquent user dealing unit 14-1 refers to the user information 20-1 using as the filter the case items which are the extraction conditions for the delinquent user extraction information 22-1, and when extracting a user who conforms to the extraction conditions, imparts an identification code to the user to generate delinquent user information 24-1 as in FIG. 11. On the contrary, a mail format 26-1 of FIG. 8 includes a mail format having a command field of contents of measures against the delinquent users for each of the identification codes used in the delinquent user information 24-1 as in FIG. 12 so that through the reference by the identification codes of the delinquent user information 24-1 a mail containing a corresponding command sentence is created from the mail format and is sent to the cellular phone 32 of the delinquent user. In other words, the embodiment of FIG. 8 is substantially the same as the part excepting the processing about the good users having no arrears in the FIG. 1 embodiment.

Figure 13:
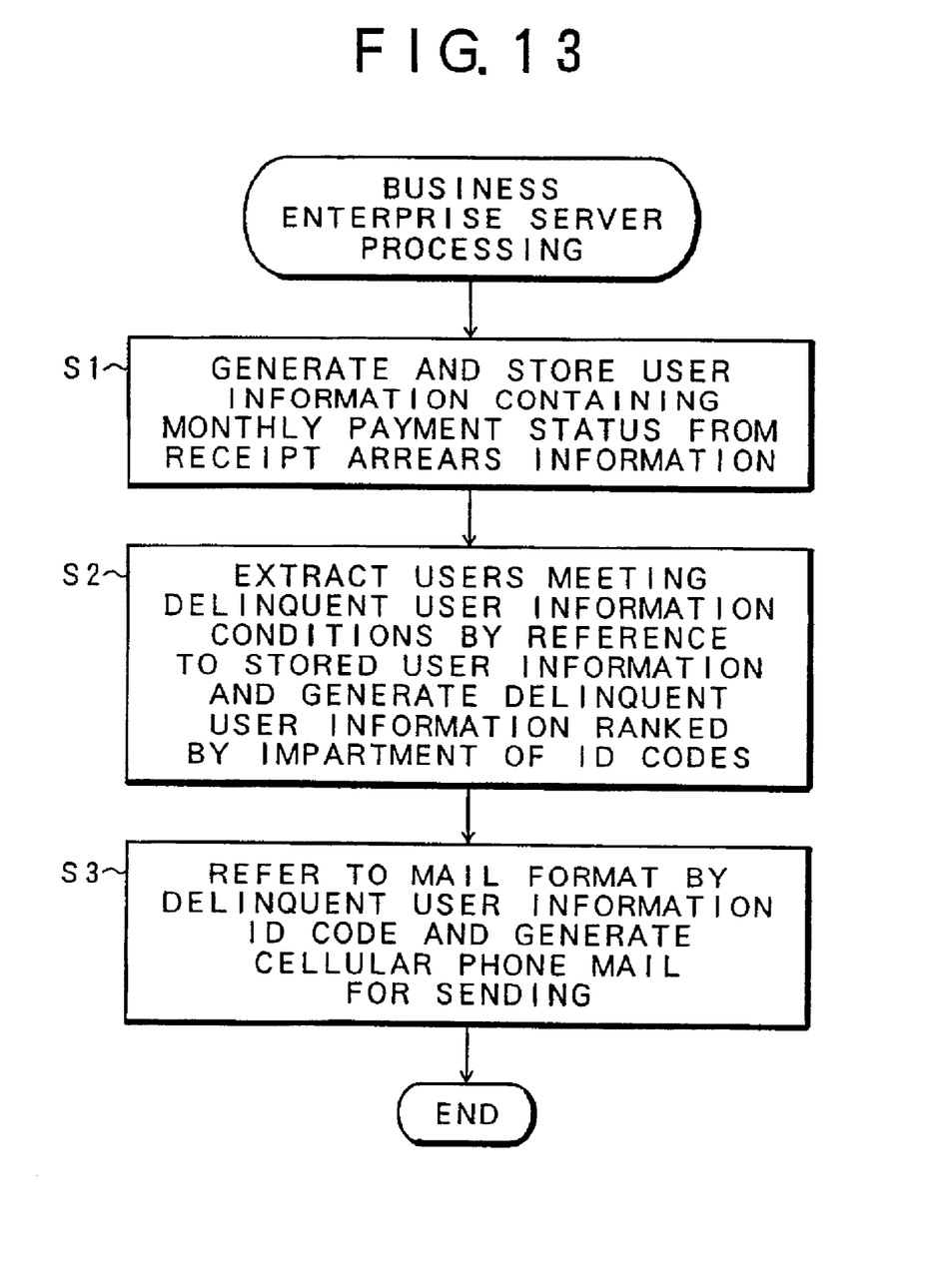
FIG. 13 is a flowchart of business enterprise server processing of FIG. 8.

FIG. 13 is a flowchart of the server processing effected by the business enterprise server 10 of FIG. 8. In this business enterprise server processing, from the receipt arrears information 16 the user information generation unit 12 generates for accumulation the user information 20-1 containing the monthly payment status in step S1. Then in step S2, the delinquent user dealing unit 14-1 extracts a user who conforms to the conditions of the delinquent user extraction information 22-1 through the reference to the user information 20-1 accumulated, to generate delinquent user information 24-1 classified by the impartment of the identification codes corresponding thereto. Then in step S3 the mail format 26-1 is referred to by the identification code of the delinquent user information 24-1 to create a mail containing a dunning command, a function restriction command, an alarm issuance command or a function restriction cancel command on the basis of the mail format, for sending to the cellular phone 32 of the thus extracted delinquent user. The processing effected in the cellular phone 32 of the delinquent user which has received this mail from the business enterprise server 10 are substantially the same as the flowchart of the cellular phone mail processing of FIG. 7.

The present invention further provides a computer readable record medium storing therein a program including a procedure of FIG. 6 which is installed and run in the business enterprise server 10 of FIG. 1, as well as a computer readable record medium storing therein a program which is installed in the business enterprise server 10 of FIG. 8 for the execution of the procedure in accordance with the flowchart of FIG. 13. The business enterprise server 10 executing the processing for the cellular phone management of the present invention has a known hard configuration. More specifically, the server 10 comprises as its major constituent elements a CPU, a main storage (RAM), an auxiliary storage (hard disk or other external storages), modems and LAN cards, which are provided as center control units and which are coupled together by a system bus for allowing the interchange of information among the constituent elements. Connected to the computer in the business enterprise server 10 are connected a display for screen display and input devices such as a mouse and a keyboard for user operations on the screen appearing on the display. Naturally, in the business enterprise server 10, the display and the keyboard do not have the same configuration. The business enterprise server 10 installs into the computer a program of the present invention recorded on a carriable record medium such as a CD-ROM or floppy disk. For the purpose of direct execution, a record medium adaptable drive may be provided for reading information from the carriable record medium. Alternatively, the program of the present invention may be recorded on a record medium in another apparatus connected via a network thereto, for the acquisition by download using a communication controller, and may be arranged on the auxiliary storage or main storage of the business enterprise server 10. In such a computer configuration, the program of the present invention recorded on the auxiliary storage, the carriable record medium or another device is developed into the main storage in response to the instruction of execution or through download from another device, to thereby allow the CPU to carry out the processing of the present invention so that the business enterprise server 10 can perform the operations as processing units described hereinabove.

According to the present invention as set forth hereinabove, specific customers, e.g., delinquent customers or good customers who have not failed to pay the charges for a certain period of time can be ascertained by ranking based on the status of payment of the cellular phone charges, whereby the customers specified by ranking are posted by mail on the dealing corresponding to the ranks so that appropriate services corresponding to the customer rankings can be provided thereto. To the delinquent customers in particular are issued a dunning by mail in case of a short delinquent period, and a cellular phone function restriction and additional alarm together with the dunning mail for a longer delinquent period, whereby it is expected that the users who have not paid the arrears in spite of acceptance of the dunning mail positively pay the arrears in response to the function restriction or issuance of alarm known to everyone. Furthermore, the dunning of the arrears can be achieved by the mail sending to the user cellular phone so that the time and costs can remarkably be reduced as compared with the convention case of sending of a printed dunning. On the other hand, good customers having no arrears are also extracted as specific customers so that incentives can be provided such as free of charge with time limit of download or charges of special contents, whereby it is possible for the good users when viewed from the connection business enterprise to be dealt fully differentially from the charge delinquent users, with the result that the subscription of further new users may be promoted by the provision of the incentives to such good customers.

Although in the above embodiments the delinquent users and the good users are extracted from the charge payment status as the specific user extraction conditions, other ranking maybe employed for specifying the cellular phone users by certain conditions on the basis of the other information containing additional information.

For example, the good users may be ranked with higher priorities in the order of higher use level from the communication use time, contents use time, etc., so that incentives corresponding to the ranks can be provided thereto.

Although the delinquent users were subjected to the dunning mail, function restriction and dunning alarm depending on the delinquent period, it is natural that the other appropriate dunning may be effected by mail functions. Thus, the present invention can include appropriate variants without impairing its objects and advantages. The present invention is not restricted by numerical values or the forms of signs shown in the above embodiments.

What is claimed is:

1. A cellular phone managing method comprising:
generating and accumulating cellular phone user information, said generating including generating user information containing charge arrears status from cellular phone receipt arrears information;
dealing with a specific user by extracting a specific user conforming to predetermined conditions from said user information and for dealing with a cellular phone of said extracted specific user in accordance with said extraction conditions,
said dealing with a specific user including:
extracting a specific user from said user information on a delinquent period basis and issuing dunning and/or function restriction to a cellular phone of said specific user depending on the delinquent period; and
sending a dunning mail to a cellular phone of said specific user in case of a short delinquent period, imposing a restriction on functions of said cellular phone of said specific user in addition to said dunning mail in case of a longer delinquent period, and causing said cellular phone of said specific user to generate an alarm in case of an even longer delinquent period.

2. A method according to claim 1, wherein said dealing comprises imposing a restriction on download of a specific content as said cellular phone function restriction.

3. A method according to claim 1, wherein said dealing comprises causing said cellular phone to generate a sound known as a dunning alarm to everyone.

4. A method according to claim 1, wherein said dealing comprises canceling said function restriction when payment of arrears is recognized during said cellular phone function restriction.

5. A method according to claim 1, wherein said specific user dealing step includes extracting a user who has paid charge as a good specific user from said user information and posting said cellular phone of said good specific user by mail on the provision of an incentive.

6. A method according to claim 5, wherein said dealing comprises providing as said incentive any one selected from the group consisting of contents intended for good users, contents use free of charge service with time limit, a discount service with time limit, and points.

7. A method according to claim 5, wherein
said generating comprises generating user information containing a contents use feature of a user from contents use information of said cellular phone, and wherein
said dealing includes providing contents intended for good users corresponding to said contents use feature to said cellular phone of said specific user.

8. A cellular phone managing apparatus comprising:
a user information generation unit generating and accumulating cellular phone user information and generating user information containing charge arrears status from cellular phone receipt arrears information;

a specific user dealing unit extracting a specific user conforming to predetermined conditions from said user information and dealing with a cellular phone of said extracted specific user in accordance with said extraction conditions, said specific user dealing unit extracting a specific user from said user information on a delinquent period basis and issuing dunning and/or function restriction to a cellular phone of said specific user depending on the delinquent period; and sending a dunning mail to a cellular phone of said specific user in case of a short delinquent period, imposing a restriction on functions of said cellular phone of said specific user in addition to said dunning mail in case of a longer delinquent period, and causing said cellular phone of said specific user to generate an alarm in case of an even longer delinquent period.

9. A record medium having therein stored a program run by a computer functioning as a server, said program comprising:

generating and accumulating cellular phone user information, said generating including generating user information containing charge arrears status from cellular phone receipt arrears information; and dealing with a specific user by extracting a specific user conforming to predetermined conditions from said user information and for dealing with a cellular phone of said extracted specific user in accordance with said extraction conditions, said dealing with a specific user comprising:

extracting a specific user from said user information on a delinquent period basis and issuing dunning and/or function restriction to a cellular phone of said specific user depending on the delinquent period; and sending a dunning mail to a cellular phone of said specific user in case of a short delinquent period, imposing a restriction on functions of said cellular phone of said specific user in addition to said dunning mail in case of a longer delinquent period, and causing said cellular phone of said specific user to generate an alarm in case of an even longer delinquent period.

10. A cellular phone managing method comprising:

generating and accumulating cellular phone user information, said generating including generating user information containing charge arrears status from cellular phone receipt arrears information;

extracting a specific user conforming to predetermined conditions from said user information;

dealing with a cellular phone of said extracted specific user in accordance with said extraction conditions, said dealing including:

extracting a specific user from said user information on a delinquent period basis and issuing dunning and/or function restriction to a cellular phone of said specific user depending on the delinquent period, and sending a dunning mail to a cellular phone of said specific user in case of a one-month delinquent period, imposing a restriction on functions of said cellular phone of said specific user in addition to said dunning mail in case of a two-month delinquent period, and causing said cellular phone of said specific user to generate an alarm in case of a three-month delinquent period.

11. A method according to claim 10, wherein said specific user dealing step includes extracting a user who has paid charge as a good specific user from said user information and posting said cellular phone of said good specific user by mail on the provision of an incentive.

12. A method according to claim 10, wherein said dealing comprises imposing a restriction on download of a specific content as said cellular phone function restriction.

13. A method according to claim 10, wherein said dealing comprises causing said cellular phone to generate a sound known as a dunning alarm to everyone.

14. A method according to claim 10, wherein said dealing comprises canceling said function restriction when payment of arrears is recognized during said cellular phone function restriction.

15. A cellular phone managing apparatus comprising:

a user information generation unit adapted to generate and accumulate cellular phone user information such that user information containing charge arrears status is generated from cellular phone receipt arrears information; and a specific user dealing unit adapted to extract a specific user conforming to predetermined conditions from said user information and to deal with a cellular phone of said extracted specific user in accordance with said extraction conditions by:

extracting a specific user from said user information on a delinquent period basis and issuing dunning and/or function restriction to a cellular phone of said specific user depending on the delinquent period, and sending a dunning mail to a cellular phone of said specific user in case of a one-month delinquent period, imposing a restriction on functions of said cellular phone of said specific user in addition to said dunning mail in case of a two-month delinquent period, and causing said cellular phone of said specific user to generate an alarm in case of a three-month delinquent period.

16. A computer readable medium storing a program for controlling a computer to perform:

generating and accumulating cellular phone user information, said generating including generating user information containing charge arrears status from cellular phone receipt arrears information;

extracting a specific user conforming to predetermined conditions from said user information;

dealing with a cellular phone of said extracted specific user in accordance with said extraction conditions, said dealing including:

extracting a specific user from said user information on a delinquent period basis and issuing dunning and/or function restriction to a cellular phone of said specific user depending on the delinquent period, and sending a dunning mail to a cellular phone of said specific user in case of a one-month delinquent period, imposing a restriction on functions of said cellular phone of said specific user in addition to said dunning mail in case of a two-month delinquent period, and causing said cellular phone of said specific user to generate an alarm in case of a three-month delinquent period.

* * * * *

UNITED STATES PATENT AND TRADEMARK OFFICE
CERTIFICATE OF CORRECTION

PATENT NO. : 7,099,651 B2  Page 1 of 1
APPLICATION NO. : 09/749420
DATED : August 29, 2006
INVENTOR(S) : Naohito Takae et al.

It is certified that error appears in the above-identified patent and that said Letters Patent is hereby corrected as shown below:

On the Title page:

Item (56) References Cited, Other Publications, Col. 2, line 2, change "Redmar" to --Redmer--

Item (74) Attorney, Agent, or Firm, col. 2, line 1, change "Stass" to --Staas--

Signed and Sealed this

Fifteenth Day of May, 2007

JON W. DUDAS
*Director of the United States Patent and Trademark Office*